(12) United States Patent
Pommersheim et al.

(10) Patent No.: US 12,504,617 B2
(45) Date of Patent: Dec. 23, 2025

(54) SWITCH BUTTON FOR AN ENDOSCOPE

(71) Applicant: AMBU A/S, Ballerup (DK)

(72) Inventors: Wilhelm Franz Pommersheim, Adelsried (DE); Felix Andreas Graw, Augsburg (DE); Klaus Peter König, Kissing (DE)

(73) Assignee: AMBU A/S, Ballerup (DK)

(*) Notice: Subject to any disclaimer, the term of this patent is extended or adjusted under 35 U.S.C. 154(b) by 409 days.

(21) Appl. No.: 17/984,007

(22) Filed: Nov. 9, 2022

(65) Prior Publication Data
US 2023/0152570 A1 May 18, 2023

(30) Foreign Application Priority Data
Nov. 10, 2021 (EP) .................................... 21207467

(51) Int. Cl.
*G02B 23/24* (2006.01)
*A61B 1/00* (2006.01)

(52) U.S. Cl.
CPC ...... *G02B 23/2476* (2013.01); *A61B 1/00066* (2013.01)

(58) Field of Classification Search
CPC .................... A61B 1/00066; G02B 23/2476
See application file for complete search history.

(56) References Cited

U.S. PATENT DOCUMENTS

| 3,917,917 A | 11/1975 | Murata |
| 4,339,634 A * | 7/1982 | Weber .................... H01H 13/06 200/302.2 |
| 5,118,909 A | 6/1992 | Husting |
| 5,209,588 A | 5/1993 | Chen |
| 5,618,212 A | 4/1997 | Moore |

(Continued)

FOREIGN PATENT DOCUMENTS

| CN | 112447429 A | 3/2021 | |
| DE | 29820853 U1 * | 3/2000 | ............. H01H 13/14 |

(Continued)

OTHER PUBLICATIONS

DE29820853U1 English Translation (Year: 2000).*
Extended search report in European Application No. 21207467.8, mailed Apr. 19, 2022, 12 pages.

*Primary Examiner* — Michael J Carey
*Assistant Examiner* — Megan Elizabeth Monahan
(74) *Attorney, Agent, or Firm* — Faegre Drinker Biddle & Reath LLP (57) ABSTRACT

An endoscope including a handle housing having apertures for legs of an operating part, an electrical switch positioned in the handle housing and having a carrier board having apertures for the legs. The operating part includes a finger pad having a finger surface, a ring connected to and extending from the finger pad, the ring having a plunger aperture, legs connected to and extending from the ring, the legs each having a spacer section and an electrical switch retention protrusion. The legs traverse the apertures of the handle housing and the carrier board to secure the electrical switch to the housing handle. The finger pad comprises elastically deformable material configured to extend toward and cause actuation of the electrical switch, when pressure is applied and to return to a rest position when pressure is released.

20 Claims, 6 Drawing Sheets

(56) References Cited

U.S. PATENT DOCUMENTS

| | | | |
|---|---|---|---|
| 5,990,435 | A | 11/1999 | Chao |
| 6,626,473 | B1 | 9/2003 | Klein et al. |
| 8,124,900 | B2 | 2/2012 | Ruppert |
| 8,247,722 | B2 | 8/2012 | Ominato |
| 8,939,489 | B2 | 1/2015 | Oeuvrard et al. |
| 9,326,811 | B2 | 5/2016 | Schnitzler |
| 9,941,069 | B2 | 4/2018 | Chen |
| 2003/0188959 | A1 | 10/2003 | Bello |
| 2014/0100424 | A1* | 4/2014 | Hoshino ............ H01H 13/14 600/118 |
| 2021/0169307 | A1 | 6/2021 | Suzuki |

FOREIGN PATENT DOCUMENTS

| | | |
|---|---|---|
| DE | 202013000198 U1 | 2/2013 |
| EP | 0955477 A1 | 11/1999 |
| EP | 1091374 A1 | 4/2001 |
| EP | 0955477 B1 | 1/2004 |
| EP | 1715497 A2 | 10/2006 |
| GB | 2283860 B | 10/1997 |
| JP | H09201326 A | 8/1997 |
| JP | H11224564 A | 8/1999 |
| JP | 3340567 B2 | 11/2002 |
| JP | 4874043 B2 | 2/2012 |
| JP | 4953688 B2 | 6/2012 |
| KR | 200166971 Y1 | 1/2000 |

\* cited by examiner

SWITCH BUTTON FOR AN ENDOSCOPE

CROSS REFERENCE TO RELATED APPLICATIONS

This application claims priority from and the benefit of European Patent Application No. EP21207467, filed Nov. 10, 2021, which is incorporated by reference herein in its entirety.

TECHNICAL FIELD

The invention relates to an endoscope with an electrical switch located on a handle of the endoscope and to a method of manufacturing the endoscope with the electrical switch.

BACKGROUND

Endoscopes, in particular insertion endoscopes, normally comprise a proximal handle from which an insertion cord extends towards the distal end of the endoscope. The insertion cord is adapted to be inserted into a body cavity. At the distal end the insertion cord comprises an articulated bending section the bending of which can be controlled by an operator using wheels and/or levers or the like at the handle. A tip part accommodates illumination and imaging electronics to generate images and video of a distal or lateral scene. An attached video processing apparatus, such as a monitor with a display screen, is used to present the images and video so that the operator of the endoscope is able to track movement during and after said insertion and possibly save the images and video.

Electrical switches may be needed to save such images and video and for other purposes involving electrical control or supply signals. For example, an electrical signal generated by an electrical switch may be used to engage a source of vacuum to suction fluids through a working channel or to engage a pump to irrigate a scene by pumping a liquid through a working channel of the endoscope. In this respect, it is well known to place such switches on the handle so that their operating members, i.e. switch buttons, are in positions that are easily accessible by the operator's fingers during use of the endoscope.

It is known to provide endoscope handles, where the switches and switch buttons are attached to an exterior surface of the handle, e.g. as adhesive foil switches. This minimizes the risk of undesired fluids and other pollutants entering into the handle, because the handle integrity needs only be broken in one place for the passage of electrical wires, and this place may be covered by the foil of the foil switches themselves.

U.S. Publication No. 2021/0169307A1 discloses an endoscope with an operating switch located inside the handle and a switch button arranged in the handle housing wall. The switch button is adapted for a multiple use endoscope, thus requiring a series of elements to securely attach the operating switch to protect electronics and other delicate parts within the handle during cleaning procedures involving aggressive cleaning fluids and high temperature and pressure from autoclaving. To achieve this, the electronics, including a switch unit, are sealed and fixated by a series of assembling elements, namely an elastic portion, a pressing member and a switch member. This renders the switch assembly more complex than needed for single use, i.e. disposable endoscopes, and, in consequence, has the drawback of being time consuming and costly to assemble.

U.S. Pat. No. 5,618,212 discloses a foot-operated pedal with switches for a water vehicle. Similar to what is described for endoscopes above this pedal uses a switch foil on the exterior of a housing. The switch buttons are provided on one large cover with legs that snap into engagement with the interior wall of the housing. The cover seals the interior from wet or moist surroundings when used in a motorized water vehicle.

BRIEF DESCRIPTION OF THE DISCLOSURE

It is a first object of the disclosure to provide a switch button which is easily manufactured and facilitates the assembly of an endoscope, in particular so as to reduce assembly time of the endoscope and reduce manufacturing costs. Furthermore, the switch button should provide good sealing properties and attachment of relevant parts of the endoscope handle while being elastically deformable under the pressure from a finger.

According to a first aspect of the disclosure this object is achieved by a switch button for an endoscope handle with a housing wall defining an outer handle surface and an interior compartment and at least one electrical switch located on a carrier within said interior compartment, wherein said housing wall and said carrier comprises a number of through holes adapted for the switch button, the switch button comprising: an operating part elastically deformable under the pressure from a finger of an operator, a number of legs, each leg comprising a spacer section, a barb section and an auxiliary section.

In this way, a switch button is adapted to fully penetrate the housing wall and the electronic switch board, thereby providing a simpler and effective assembling solution. During assembly, the auxiliary section of the legs functions as an assembly aid to allow a secure grab of the legs of the switch button in order to easily pull the legs through the through holes of the housing wall and the switch board to complete the assembly.

According to a second aspect of the disclosure the object is achieved by a method for manufacturing a switch button according to the first aspect of the disclosure wherein the switch button is manufactured by injection moulding.

According to a third aspect of the disclosure the object is achieved by a method for mounting a switch button in an endoscope comprising: providing an endoscope having a handle with a housing wall having a number of through holes and defining an outer handle surface and an interior compartment, providing a switch button according to the first aspect of the disclosure, inserting the legs of the switch button through the through holes of the handle housing from the outer handle surface, inserting the legs of the switch button into the through holes of the carrier for the electrical switch button, and passing the barb section completely through the through holes of the carrier by pulling the auxiliary section. In this way a simple assembly method is provided in which the switch button functions as a sealing mechanism. The switch button further functions as an assembly element to fixate the switch button in the interior compartment of the endoscope handle.

According to a fourth aspect of the disclosure the object is achieved by an endoscope comprising a switch button manufactured according to the second aspect of the disclosure.

According to a fifth aspect of the disclosure, the object is achieved by a system comprising a video processing apparatus and an endoscope according to the fourth aspect of the disclosure connectable to the video processing apparatus.

In an embodiment of the first aspect of the disclosure the auxiliary section has a smaller diameter than the spacer section. This facilitates the insertion of the legs into the through holes of the handle housing and the carrier.

In an embodiment the barb section completely encircles the leg. This ensures the best possible retention of the carrier.

In an embodiment the switch button further comprises a plunger adapted to operate the electric switch. This facilities assured and consistent activation of the electrical switch.

In an embodiment the plunger comprises a contact. This allows the switch to be constituted directly by conductors on the carrier, thus saving a separate electrical switch unit.

In an embodiment, the switch button is adapted to seal the through holes of the endoscope handle housing wall when mounted on the endoscope handle. This further protects the endoscope handle from undesired ingress of fluids and pollutants.

In an embodiment, the switch button is of an elastomeric material with a shore A hardness in the range 40 to 70, preferably in the range of 50 to 60. This ensures good sealing and good activation of the electric switch.

In an embodiment, the auxiliary section comprises a break zone. This may avoid a separate step of cutting away any disturbing excess length of the auxiliary section after assembly of the switch.

In an embodiment, the break zone has a cross sectional area smaller than the auxiliary section. This will weaken the auxiliary section in a desired location and ensure that after assembly the remaining length of the auxiliary section, has a suitable length.

BRIEF DESCRIPTION OF THE DRAWINGS

In the following, the disclosure will be described in greater detail with reference to non-limiting exemplary embodiments and the enclosed schematic drawings, on which.

DETAILED DESCRIPTION

Figure 1:
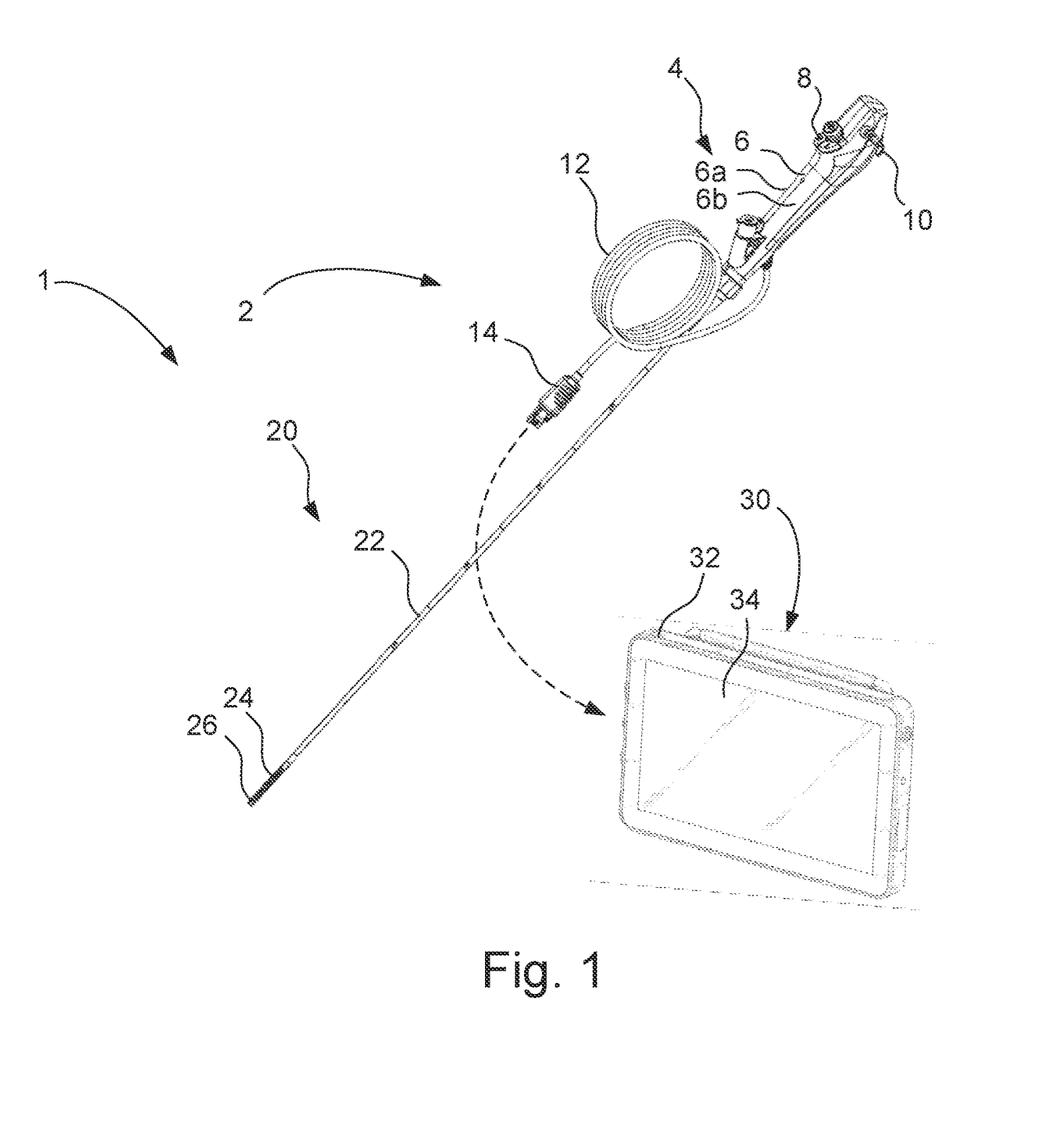
FIG. 1 shows a visualization system comprising an endoscope and a video processing apparatus according to one embodiment of the present disclosure.

Turning first to FIG. 1, a visualization system 1 comprising an endoscope 2 and a video processing apparatus (VPA) 30 according to the present disclosure are shown. The endoscope 2 has a proximal end with a handle 4 from which an insertion cord 20 extends. The handle 4 may be ergonomically designed to be comfortably held and operated with a single hand during use by the operator and may comprise a housing 6 having two halves, or parts, designated as 6a and 6b. The distal end of the insertion cord 20 may constitute an insertion tube 22, a bending section 24, and a tip part 26 at the distal end of the endoscope 2. The bending section is articulated by a designated button 10 on the handle. The tip part 26 comprises a camera. One or more switch buttons 8 on the handle 4 may cooperate with the VPA 30 and the camera to save images and/or video. The switch buttons 8 and additional switch buttons may be used for other purposes, including actuation of irrigation and vacuum systems coupled with the endoscope 2. A cable 12 having a connector 14 is provided to electrically connect the endoscope 2 with the VPA 30 to display content, e.g. images and video, obtained with the camera.

In the present embodiment, the VPA 30 comprises a housing 32 and a display screen 34. In other embodiments the display screen 34 is omitted. In both embodiments the VPA 30 may communicatively connect with a remote display screen via wireless, HDMI, internet, or other known wired communication configurations, protocols, networks and systems.

Figures 2, 3, 4:
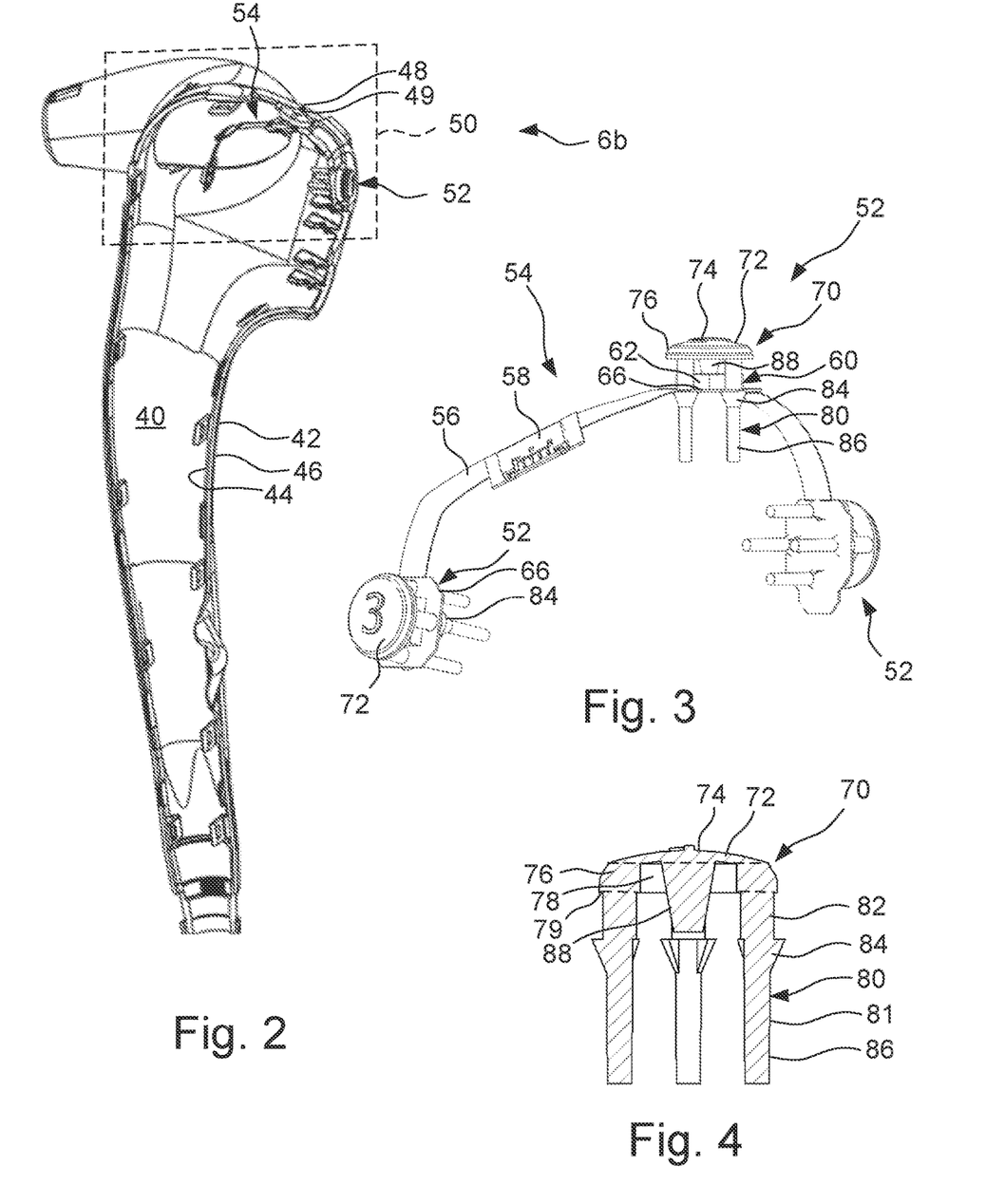
FIG. 2 shows one part of a handle housing forming an interior compartment of the handle.
FIG. 3 shows a switch harness with three switch assemblies attached to a carrier circuit according to an embodiment of the present disclosure.
FIG. 4 shows a cross-section of an embodiment of an operating part according to the disclosure of the switch assemblies of FIG. 3.
Figure 5:
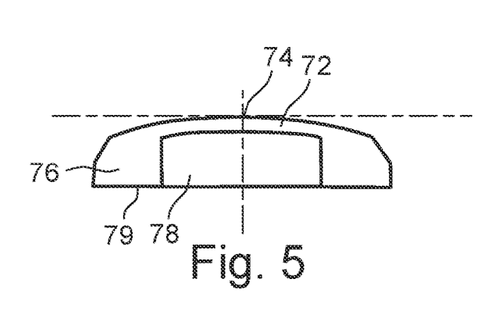
FIGS. 5 and 6 illustrate two states of the operating part of FIG. 4.
Figure 6:
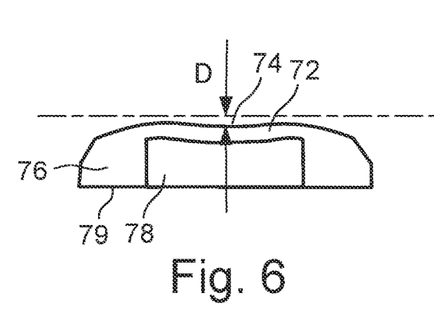

FIG. 2 shows another embodiment of a housing part 6b of the handle 4 revealing an interior compartment 40 defined by a handle housing wall 42 of the handle 4 together with a complementary handle housing wall (not shown) of the housing part 6a. The handle depicted in FIG. 2 differs slightly in layout from that of FIG. 1, thus illustrating that the present disclosure relates to a multitude of different layouts of handles for endoscopes. The endoscope 2 comprises an inner handle surface 44 directed towards the interior compartment 40 and an outer handle surface 46 opposite the inner handle surface 44. A dashed perimeter 50 encloses a proximal portion of the handle 4 which is enlarged and described in more detail with reference to FIG. 7. The proximal portion of the handle 4 includes a switch assembly 52. In some embodiments, some components of the switch assembly 52 may, optionally, be provided in a switch harness 54. For example, the switch harness may comprise a flexible circuit board connecting two electrical switches.

FIG. 3 shows an embodiment of the switch harness 54. In the present embodiment the switch harness 54 comprises three switch assemblies 52, a carrier circuit 56, and an electrical connector 58. The electrical connector 58 comprises connectors or pads electrically connected by the carrier circuit 56 to the three switch assemblies 52. When a switch of a switch assembly 52 is actuated, a corresponding signal is communicated via the carrier circuit 56 to the electrical connector 58 and through the electrical connector 58 to a processor located in the handle 4 or in the VPA 30.

The switch assembly 52 will now be described with reference to FIGS. 3 to 6 and 8 to 11. The switch assembly 52 includes an electrical switch 60 positioned in the interior compartment 40 and having a switch body 62 with an actuation surface 64 and a carrier board 66 opposite the actuation surface 64, the carrier board 66 (best seen in FIG. 11) has two or more apertures 68 corresponding to two or more apertures 48 (shown in FIGS. 2 and 7) in the housing 6. The actuation surface 64 is aligned with an actuator aperture 49 (shown in FIGS. 2 and 7) in the housing. The switch body includes electrical components linked with the actuation surface 64. The electrical switch is an electrical component that can disconnect or connect the conducting path in an electrical circuit, interrupting the electric current or diverting it from one conductor to another. The most common type of switch is an electromechanical device consisting of one or more sets of movable electrical contacts connected to external circuits. When a pair of contacts is touching current can pass between them, while when the contacts are separated no current can flow. Switches are made in many different configurations; they may have multiple sets of contacts controlled by the same knob or actuator, and the contacts may operate simultaneously, sequentially, or alternately. Other switches include integrated circuits in which a transistor or other electronic component can be operated to switch current flow. The transistor includes three contacts, two for passing current and one, referred to as the base contact, for allowing or ceasing current flow between the two contacts. A pair of contacts can be provided to allow a voltage to reach the base contact, as is known in the art. Electrical switches may retain a given state until actuated again or may only hold a state while being actuated. Any known or future developed switch actuated by pressing or releasing a contact surface may be used.

In some embodiments, a plunger of the operating part, e.g. the plunger 88 described below, includes an electrically conductive distal surface. The electrically conductive distal surface may be comprised by a metallic layer bonded to a distal surface of the plunger. The switch body may enclose two contacts on a printed circuit board, such as the carrier circuit 56 shown in FIG. 3. Thus, when the finger pad is pressed, the electrically conductive distal surface closes a gap between the two contacts, the electrically conductive distal surface and the two contacts forming the electrical switch. Alternatively, the two contacts overlap and a plunger without the electrically conductive distal surface presses one of the contacts into the other, the plunger and the two contacts forming the switch. A thin layer of material may separate the two contacts to ensure they do not connect inadvertently. Forming switches as described in this paragraph reduces manufacturing costs by forming the switch in the carrier circuit. The contacts may be formed in a copper layer of a flexible circuit board, for example. In one variation, a bridge of metallic material may be added instead overlapping contacts and/or an electrically conductive distal surface. The bridge of metallic material can be added via a thin adhesively bonded foam layer holding ends of the bridge, the middle of the bridge connecting two contacts of the carrier circuit.

The switch assembly 52 also comprises an operating part 70 comprising a finger pad 72 having a finger surface 74, a ring 76 connected to and extending from the finger pad 72, two or more legs 80 connected to and extending from the ring 76, each of the legs comprising a peripheral surface 81 and an electrical switch retention protrusion 84 extending radially outwardly from the peripheral surface 80. The ring has an optional actuator aperture 78 encircling a plunger 88 and an interior surface 79 opposite the finger pad 72, the interior surface facing the exterior surface 42 of the housing. The actuator aperture 78 makes it easier to push the plunger 88 down when operating the finger pad and contributes to a more comfortable and less energy demanding operation.

The two or more legs 80 traverse the two or more apertures 48 of the housing and the two or more apertures 68 of the carrier board 66 to align the actuator aperture 49 of the housing with the actuation surface 64 of the electrical switch 60. The electrical switch retention protrusions 84 extend through the two or more apertures 68 of the carrier board 66 and secure the electrical switch 60 to the housing 6 in a predetermined position defined by the apertures. The finger pad 72 comprises elastically deformable material configured to extend, from a rest position shown in FIG. 5 to an engaged position shown in FIG. 6 and exemplified by a depression distance D travelled by the finger surface 74 toward the electrical switch 60 when pressure is applied to the finger surface 74. The finger pad 72 is biased by its composition to retract to the rest position when the pressure is released. The shape of the finger pad may aid to further bias it to the rest position (e.g. inverted cup shape). Extension and/or retraction of the finger pad 72 translates the plunger 88 to actuate the electrical switch 60. The switch assembly 52, and variations thereof, are further described below.

Figure 7:
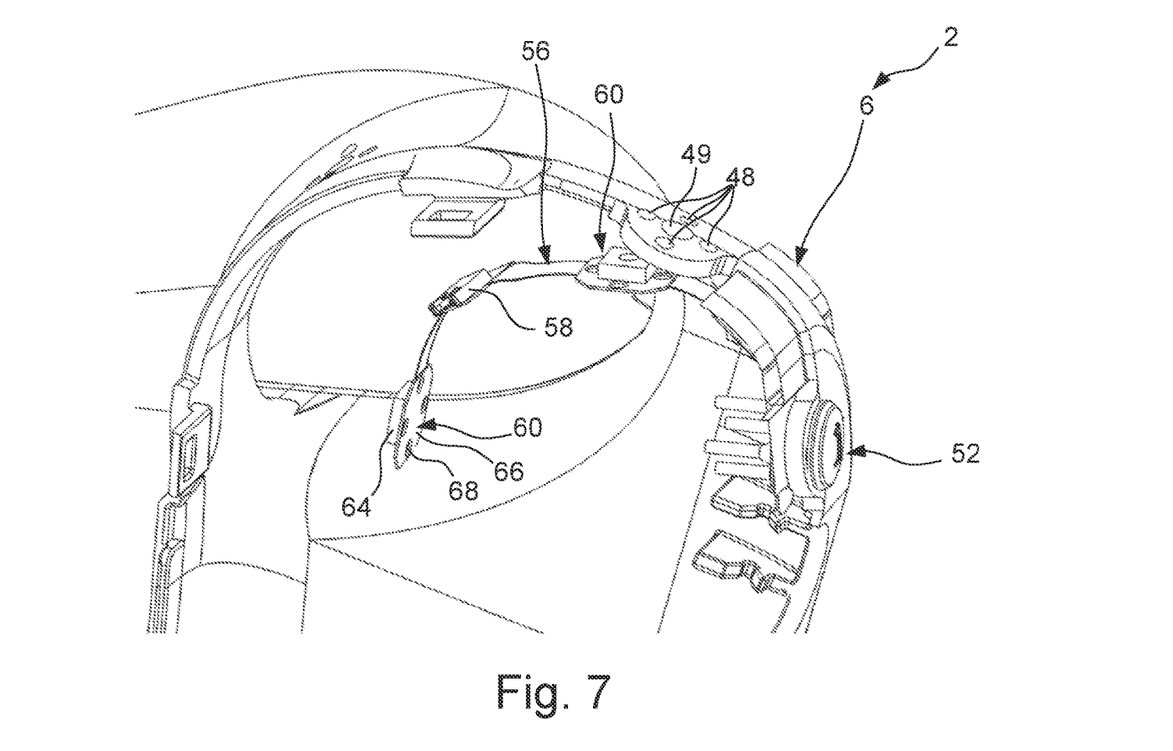
FIG. 7 shows an enlarged view of the proximal end of the part of the handle housing of FIG. 2.

The handle 4 may, as indicated above, comprise two or more housing parts 6a, 6b fitted together during the assembly process to partly or fully enclose the interior compartment 40. As can further be seen from FIG. 2, the at least one electrical switch 52 may be placed on the carrier circuit 56. It should be noticed that the carrier circuit as shown in FIG. 2 is not yet in its fully assembled state, as only one switch has been mounted. The carrier circuit 56 is in this embodiment a flexible sheet, in particular a flexible printed circuit board or a flat ribbon cable, that can adjust to curvatures of the inner handle surface 44. An added advantage is that the switches do not have to be precisely mounted on the flexible carrier circuit since some slack in the carrier circuit is permissible between switches. In this respect it should be noticed that FIGS. 2 and 7 show the carrier circuit 56 during assembly, i.e. with only one of three switches in place and securing the switch harness to the handle housing 6. The carrier circuit 56 may, in another embodiment, be of a more rigid material such as an epoxy based printed circuit board. In either case the carrier circuit 56 may also incorporate the connector 58 for electrically connecting the switch harness to wires or cables of the endoscope 2, e.g. leading to the VPA 30 via the cable 12. The switches may also be directly connected to the wires or cables of the endoscope 2 without a switch harness.

FIG. 7 shows an enlarged version of the top part of the endoscope handle 6 from FIG. 2 where the electrical switch 60 is embodied with the holes 68 configured to align with the holes 48 of the handle housing 6. FIG. 7 additionally shows that the electrical switch 60 is assembled with the handle housing 6 by using the legs 80 to secure the carrier board 66.

Referring now to FIGS. 8 to 11, preferably the operating part 70 is made of an elastomeric material in a single-piece construction. The material can be a natural or synthetic rubber. In yet another embodiment it may be a silicone. The material from which the operating part 70 is made preferably has a shore A hardness in the range 40 to 70, more preferred in the range of 50 to 60. The legs 80 may be characterized as having sections 82, 84 and 86. A material with such specifications results in an operating part 70 that conforms to the curvature of the outer handle surface 46 and thereby increases the sealing properties of the operating part 70.

The section 82 is a spacer section, section 84 is the electrical switch retention protrusion, and section 86 is an auxiliary section. Section 82 extends from the interior surface 79 of the ring 76 to the section 84. The length of the section 82 aids in setting a compression tension between the interior surface 79 and the section 84. The compression tension can be sufficient to firmly secure the electrical switch 60 to the handle 6 and simultaneously seal the interior surface 79 with the exterior surface 46. Thus, the composition and structure of the operating part 70 simultaneously secures the electrical switch 60 to the handle 6 and seals the holes 48, 49. Other characteristics of the legs 80, such as diameter, aid in setting the desired compression tension.

In a preferred embodiment the spacer section 82 has a length corresponding the combined thickness of the handle housing wall 42, the switch body 62, and the carrier board 66. In another embodiment the length of the spacer section 82 may be shorter than the combined thickness of the handle housing wall 42, the switch body 62, and the carrier board 66. Consequently, the operating part 70 will exert a larger pressure on the outer handle surface 46 and provide better sealing properties. To further enhance sealing the operating part 70 will, in its mounted position, completely cover the holes 48 intended for the legs 80. The spacer section 82 may have a crosswise dimension, or in some embodiments diameter, preferably adapted to fit in a sealing manner in the holes 48 in the handle housing wall 42. The crosswise dimension may be slightly larger than the crosswise dimension of the holes 48, e.g. 1, 2, 3, 5, or up to 10% larger.

Figure 9:
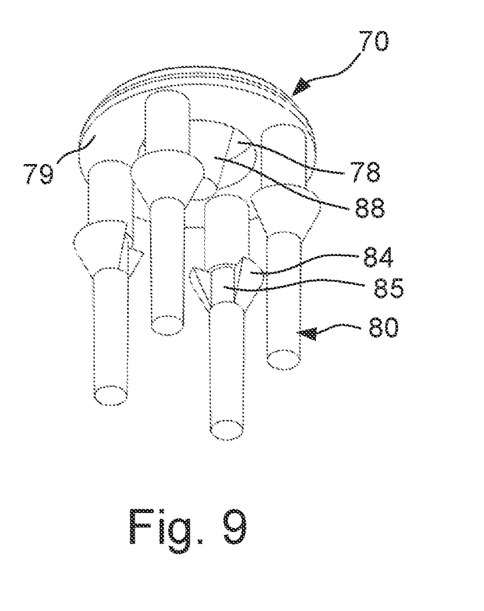

As shown in FIG. 9, the section 84 may comprise a conical shape with a longitudinal cut-out 85 provided to facilitate radial compression and thus insertion of the section 84 through the holes 86. The shape of the section 84 may comprise a plurality of longitudinal protrusions instead of a single conically shaped protrusion. The section 84 presents a surface larger, closer to the ring, than the holes 68 such that the section 84 can only reasonably pass through the holes 68 in one direction. In some variations, the section 84 completely encircles the periphery of the leg. In a preferred variation the section 84 partly encircles the leg 82 to an extent in the range of 180°-360°. This encircling may be continuous or in a number of discrete barbs e.g. as circular sectors. The barbs are preferably conical to easily guide them through the apertures of the handle housing and the carrier circuit during assembly. Consequently, the sections 84 will not move reversely through the apertures once mounted and the switch assembly will be securely attached to the handle housing.

The section 86 facilitates insertion of the section 84. A user can insert the section 86 through the hole 68 and then pull the section 86 to stretch the leg 80 while simultaneously pushing the electrical switch 60 toward the handle housing 6 until the section 84 passed through the hole 68. After mounting of the electrical switch 60 the section 86 may be cut and removed. The auxiliary section 86 may have a crosswise dimension smaller than the crosswise dimension of the spacer section 82. This will facilitate the insertion through the through holes 48 in the handle housing wall 42 and the corresponding holes 68 arranged in the carrier board 66. The holes 48 and 68 correspond in the sense that their spacing and pattern are the same, so that the holes 68 in the carrier board 66 are arranged around the switch base 62 and the plunger hole 49. Furthermore, the auxiliary section 86 may, in some embodiments, have a taper in the direction away from the switch base 62. The endoscope of claim 10, wherein each of the legs includes a break section having a cross-section smaller than the auxiliary section, the break section being positioned between the electrical switch retention protrusion and the auxiliary section. In one embodiment the break zone may be a structural weakening in the form of a slit.

The finger pad, the ring, and the two or more legs in any of the disclosed embodiments may be comprised of the same elastically deformable material. Alternatively, the hardness or tackiness of the ring, the finger pad, and the legs may be varied to enhance the functionality of each part. The composition of elastic material can be varied in a multi-port injection molding process, for example, each port adding a different material. Alternatively, the finger pad, the ring, and the two or more legs may be bonded to form a single-piece part and not formed integrally as a single-piece part.

Figure 12:
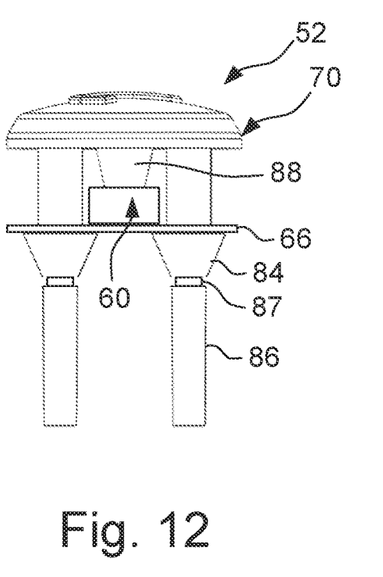
FIG. 12 shows a variation of the operating member of FIG. 4.

Referring to FIG. 12, the legs may comprise a break section 87 having a cross-section smaller than the auxiliary section, the break section being positioned between the electrical switch retention protrusion and the auxiliary section. The break section is configured to facilitate removal of the auxiliary sections after assembly.

In the embodiment shown in FIGS. 4, 8 to 10, and 12, the operating part 70 includes the plunger 88. The plunger 88 may extend in a direction that is parallel with the legs 80. In this embodiment the finger pad 72 has a dome shape. In other embodiments, the finger pad 72 may have square, oval or other shapes.

In the embodiment shown in FIGS. 4, 8 to 10, and 12, the operating part 70 includes legs with circular cross-sections. All sections of the leg may have circular cross-sectionals. In other embodiments the cross-section of the legs may be square or have more complex shapes. Round holes and legs may be easier to manufacture than holes with corners, such as square or rectangular shapes.

Figure 13:
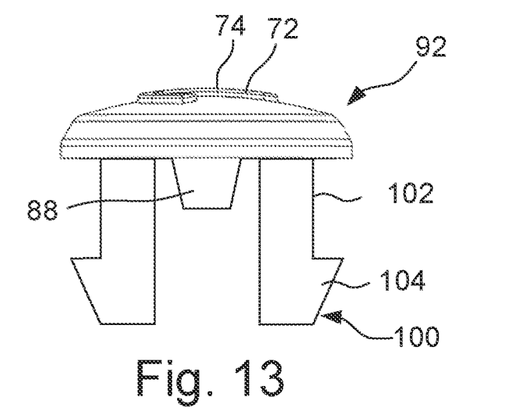
FIGS. 13 to 15 show elevation and cross-sectional views of components of switch assemblies according to another embodiment of the disclosure.
Figure 14:
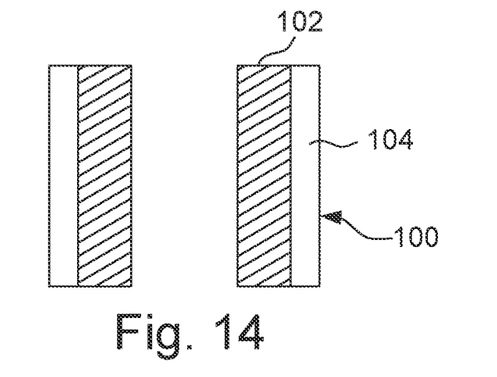
Figure 15:
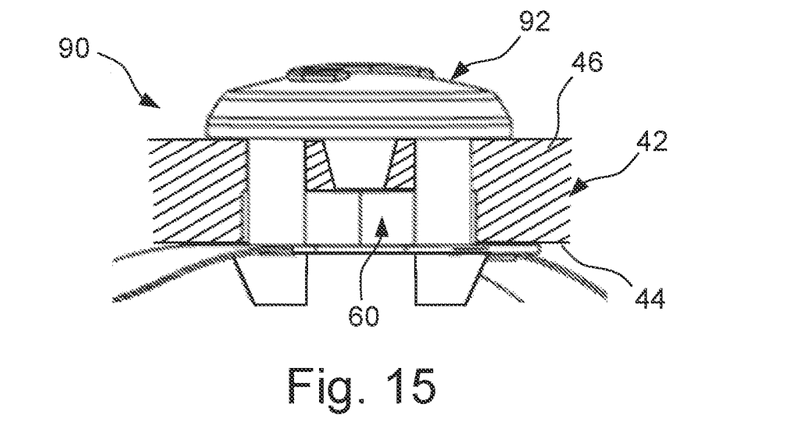

FIGS. 13 to 15 show another embodiment of a switch assembly, denoted by numeral 90, having an operating member 92 with legs 100 having sections 102 and 104, which are analogous to operating member 70 with legs 80 having sections 82 and 84. The operating members differ in that only two legs are present in the operating member 92, and these legs have rectangular cross-sections instead of round cross-sections. The legs may include auxiliary sections, and potentially break sections as well.

Figure 8:
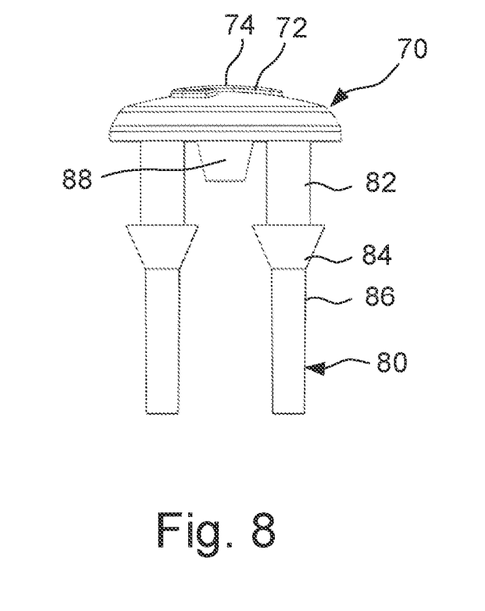
FIGS. 8 to 11 show elevation, perspective and plan views of components of the switch assemblies of FIG. 3.
Figure 10:
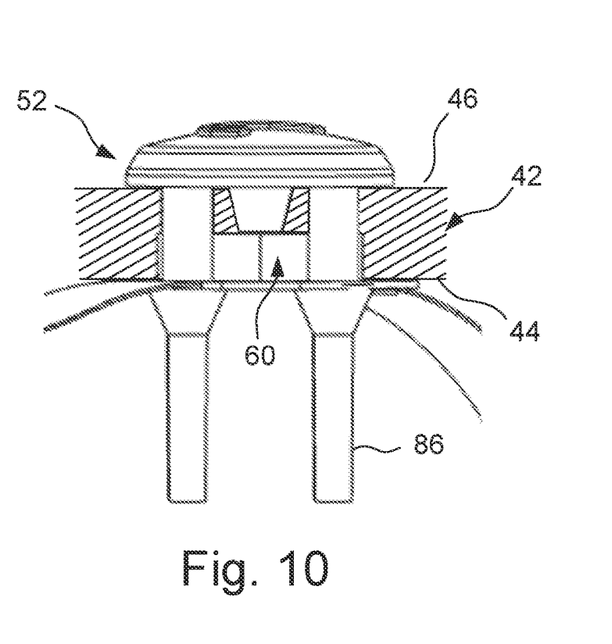
Figure 11:
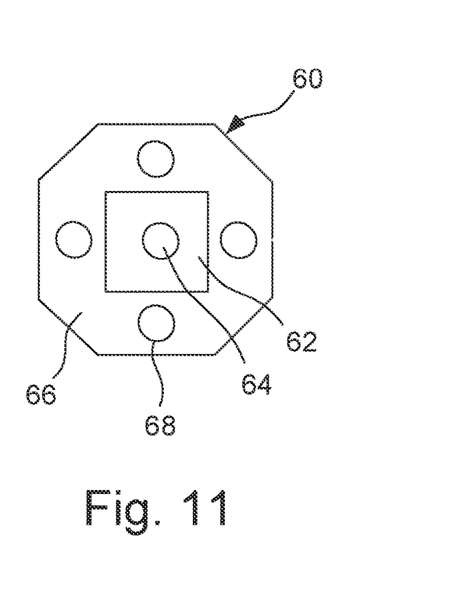
Figure 16:
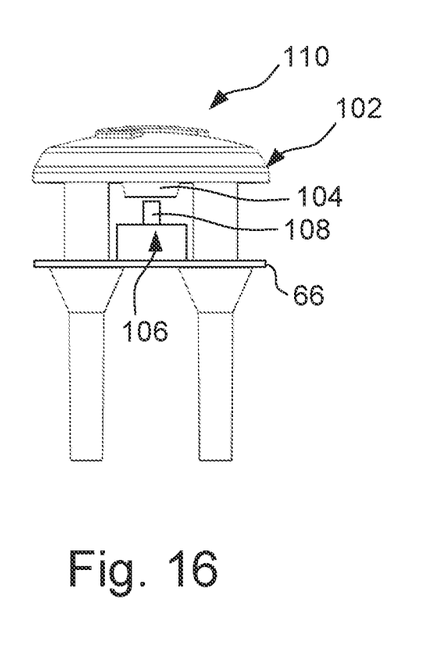
FIG. 16 shows an elevation view of components of a switch assembly according to a further embodiment of the disclosure.

Either the operating part, the electrical switch, or both may comprise a plunger. An operating part plunger 88 is shown in FIGS. 8 to 10. In FIG. 16 a switch assembly 102 is shown having an operating member 110 and an electrical switch 106. The operating member 110 has a shorter plunger 104 than the plunger 88 and the electrical switch 106 has a switch plunger 108. The plungers cooperate to activate the switch.

A layer of material may be interposed between the ring and the handle housing to increase sealing. The material may be sprayed, spread or added as a thin self-adhesive to the ring, for example.

During assembly, an assembler will take the operating part 70 and easily guide the auxiliary section 86 through the holes 48 of the handle housing wall 42, due to the narrower and preferably tapered design of the auxiliary sections 86. This will save time during the assembling process as the assembler will easily insert and continue to guide the auxiliary section 86 through the holes 68 of the carrier board 66. Once the auxiliary section 86 has been successfully and effortlessly guided all the way through both sets of holes, the assembler will grab the auxiliary sections 68 now located in the interior compartment 40. At this point the assembler will pull each auxiliary section 86, thereby forcing the section 84 through both sets of holes. The spacer section 82 is now located in the holes 48 and 68 to ensure that the switch assembly 52 and the handle housing wall 42 are held tightly against each other with a suitable tension to allow the electrical switch 60 to be operated only when the operating part 70 is depressed. However, for the given ranges of hardness mentioned above the spacers will still ensure that the force is still sufficient to activate the electrical switch 60 rather than pushing the carrier board 66 with the switch body 62 away from the handle housing wall 42 without activation the electrical switch 60.

After assembly the auxiliary sections 86 are no longer needed and may be removed e.g. by cutting away or otherwise removing any excess length thereof that could conflict with other internal parts of the endoscope 2, e.g. pull wires and operating members thereof within the handle 4.

The operating part may be integrally moulded as one unitary item and is preferably manufactured with injection moulding. This requires a moulding chamber that captures all the details of the operating part with as few moulding parts as possible. The operating part is preferably moulded with two moulding parts, a concave and a convex part. Due to the elasticity of the material with a Shore A hardness in the range of 40 to 70, it will be possible to retract the convex mould part from the concave mould part, even if the sections 84 are undercut. However, in order for the convex part to reach and form the plunger 88 and the plunger aperture 78, it is preferred to form the section 84 with the cut-out 85 to allow room for the moulding part.

The embodiments shown in the figures and described herein are not to limit the scope of the invention, which is defined by the claims appended hereto.

Furthermore, the skilled person will appreciate that although described in the context of an endoscope the disclosed switch assembly may be used in a multitude of other devices where a simple way of securing a switch assembly inside a cavity is desired. Example other devices include laryngoscopes, endotracheal tubes, and other medical insertion devices.

The following items are examples of various embodiments and variations thereof disclosed above, and others:

1. A switch button for an endoscope handle with a housing wall defining an outer handle surface and an interior compartment and at least one electrical switch located on a carrier within said interior compartment, wherein said housing wall and said carrier comprises a number of through holes adapted for the switch button, the switch button comprising: an operating part elastically deformable under the pressure from a finger of an operator, a number of legs, each leg comprising a spacer section, a barb section and an auxiliary section.

2. A switch button according to item 1, wherein the auxiliary section has a smaller diameter than the spacer section.

3. A switch button according to any one of the preceding items, wherein the barb section completely encircles the leg.

4. A switch button according to any one of the preceding items, wherein the switch button further comprises a plunger adapted to operate the electric switch.

5. A switch button according to item 4, wherein the plunger comprises a contact.

6. A switch button according to any one of the preceding items, wherein the switch button is adapted to seal the through holes of the endoscope handle housing wall when mounted on the endoscope handle.

7. A switch button according to any one of the preceding items, wherein the switch button is of an elastomeric material with a shore A hardness in the range 40 to 70, preferably in the range of 50 to 60.

8. A switch button according to any of one of the preceding items, wherein the auxiliary section comprises a break zone.

9. A switch button according to item 8, wherein the break zone has a cross sectional area smaller than the auxiliary section.

10. A method for manufacturing a switch button according to any one of the preceding items, wherein the switch button is manufactured by injection moulding.

11. A switch button according to item 10, wherein the switch button is integrally moulded as one unitary item.

12. A method for mounting a switch button according to any of the preceding items comprising: providing an endoscope having a handle with a housing wall having a number of through holes and defining an outer handle surface and an interior compartment, providing a switch button according to any one of items 1 to 9, inserting the legs of the switch button through the through holes of the handle housing from the outer handle surface, inserting the legs of the switch button into the through holes of the carrier for the electrical switch button, and passing the barb section completely through the through holes of the carrier by pulling the auxiliary section.

13. An endoscope comprising a switch button manufactured according to the method of item 10.

14. A system comprising a monitoring device and an endoscope according to item 13 connectable to said monitoring device.

We claim:

1. An endoscope comprising:
   a handle housing having a housing wall, the housing wall defining an interior compartment, the handle housing having an exterior surface and an interior surface, a plunger aperture, and two or more apertures extending from the exterior surface to the interior surface adjacent to the plunger aperture;
   an electrical switch positioned in the interior compartment and having an actuation surface and a carrier board opposite the actuation surface, the carrier board having two or more apertures corresponding to the two or more apertures in the handle housing, the plunger aperture overlapping, at least in part, the actuation surface; and
   an operating part comprising:
      a finger pad having a finger surface;
      a ring connected to and extending from the finger pad, the ring having a plunger aperture and an interior ring surface opposite the finger pad, the interior ring surface contacting, at least in part, the exterior surface of the handle housing;
      two or more legs connected to and extending from the ring, the two or more legs each comprising a spacer section having a peripheral surface and an electrical switch retention protrusion extending radially outwardly from the peripheral surface,
      wherein the two or more legs traverse the two or more apertures of the handle housing and the two or more apertures of the carrier board to align the plunger aperture of the handle housing with the actuation surface of the electrical switch,
      wherein the electrical switch retention protrusions extend through the two or more apertures of the carrier board and secure the electrical switch to the handle housing in a predetermined position, and
      wherein the finger pad comprises an elastically deformable material configured to extend, from a rest position, toward the electrical switch when pressure is applied to the finger surface, extension of the finger pad causing actuation of the electrical switch, and
      wherein the finger pad is biased to return to the rest position when the pressure is released.

2. The endoscope of claim 1, wherein the operating part comprises a prefabricated single-piece part.

3. The endoscope of claim 2, wherein the ring and the two or more legs are comprised of the elastically deformable material.

4. The endoscope of claim 3, wherein the elastically deformable material has a shore A hardness in the range of, and including, 40 to 70.

5. The endoscope of claim 3, wherein the elastically deformable material, the ring and the two or more legs are configured to seal the two or more apertures, and the plunger aperture, of the handle housing.

6. The endoscope of claim 3, further comprising a plunger connected to and extending from the finger pad and traversing the plunger aperture of the handle housing, wherein the plunger is comprised of the elastically deformable material and is integrally formed with finger pad, the ring, and the two or more legs in the single-piece part.

7. The endoscope of claim 6, wherein the plunger extends from the finger pad to the actuation surface without actuating the electrical switch.

8. The endoscope of claim 1, further comprising a second electrical switch and a flexible circuit board connecting the electrical switch and the second electrical switch to form a switch harness.

9. The endoscope of claim 1, wherein each of the two or more legs further comprises an auxiliary section extending from the electrical switch retention protrusion.

10. The endoscope of claim 9, wherein the auxiliary section comprises a smaller radial cross-section than the spacer section.

11. The endoscope of claim 10, wherein each of the two or more legs includes a break section having a cross-section smaller than the auxiliary section, the break section being positioned between the electrical switch retention protrusion and the auxiliary section.

12. The endoscope of claim 11, wherein the break section comprises a notch configured to detach the auxiliary section when a predetermined amount of force is applied to extend each of the two or more legs.

13. The endoscope of claim 1, wherein the electrical switch retention protrusion comprises a larger radial cross-section than the spacer section.

14. The endoscope of claim 13, wherein the electrical switch retention protrusion comprises a longitudinal cut-out.

15. A method for manufacturing the endoscope of claim 1, the method comprising:
providing the handle housing;
providing the electrical switch;
providing the operating part comprising:
inserting the two or more legs through the two or more apertures of the handle housing and the two or more apertures of the carrier board, with the interior ring surface facing the exterior surface of the handle housing and the plunger aperture overlapping, at least in part, the actuation surface of the electrical switch; and
moving the carrier board toward the handle housing until the electrical switch retention protrusions pass through the two or more apertures of the carrier board to secure the electrical switch to the handle housing.

16. The method of claim 15, wherein moving the carrier board toward the handle housing comprises pulling the two or more legs away from the handle housing to stretch the two or more legs.

17. The method of claim 15, wherein the operating part comprises an integrally formed single-piece part.

18. The method of claim 17, wherein the ring and the two or more legs are comprised of the elastically deformable material.

19. The method of claim 18, wherein the elastically deformable material has a shore A hardness in the range of, and including, 50 to 60.

20. A visualization system comprising:
a video processing apparatus; and
an endoscope according to claim 1.

* * * * *